UNITED STATES PATENT OFFICE.

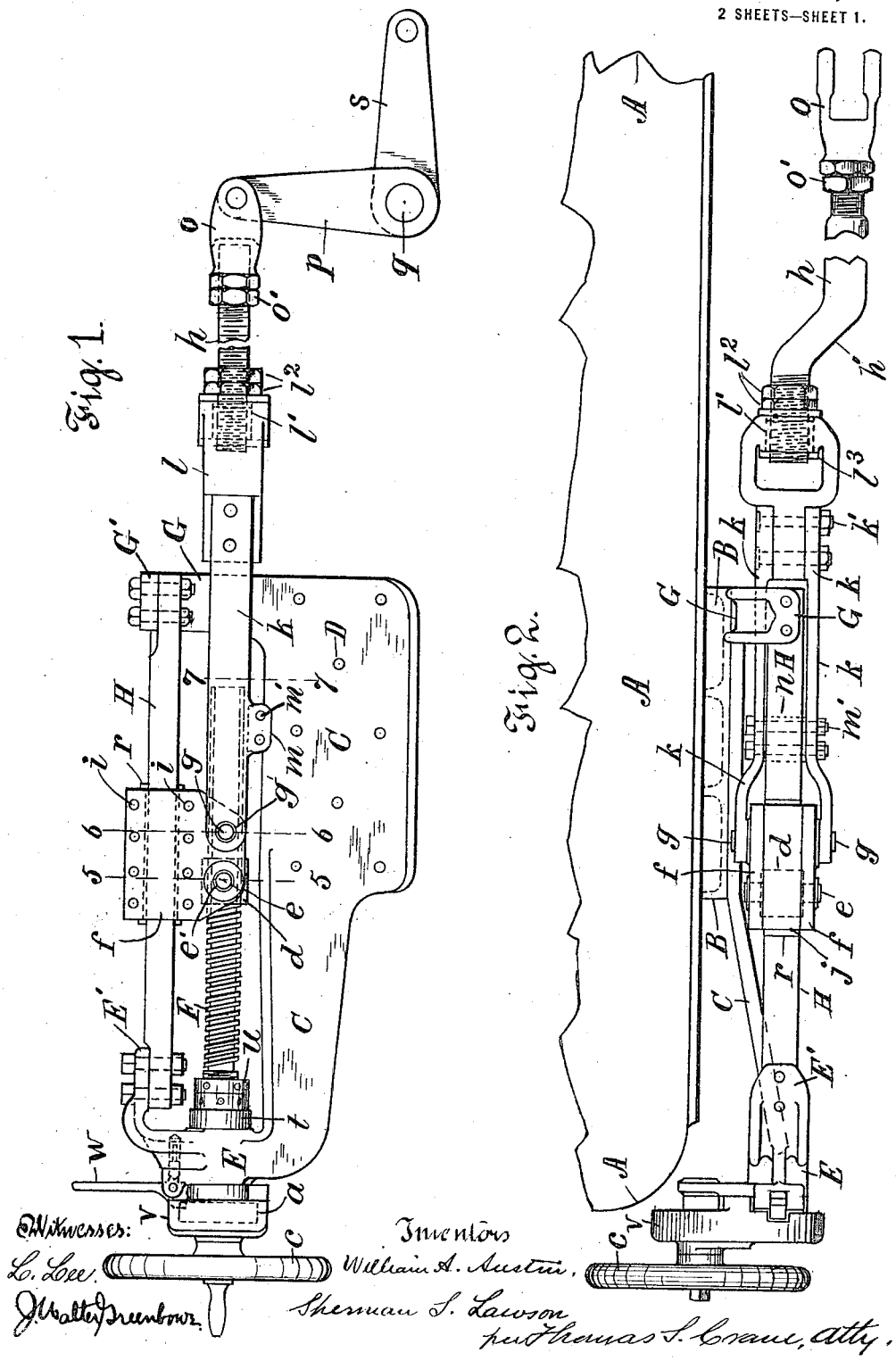

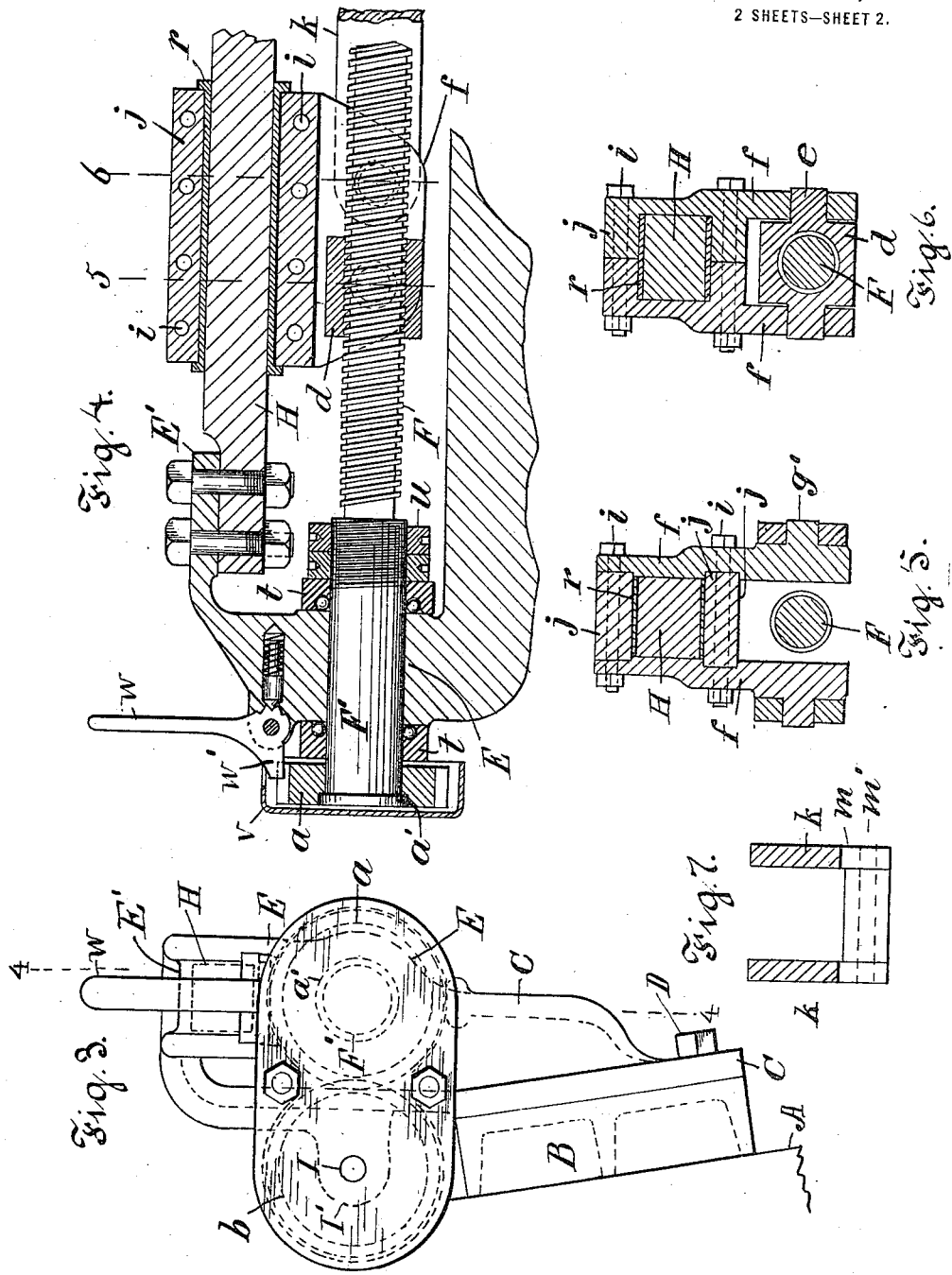

WILLIAM A. AUSTIN AND SHERMAN S. LAWSON, OF LIMA, OHIO, ASSIGNORS TO LIMA LOCOMOTIVE CORPORATION, OF LIMA, OHIO, A CORPORATION OF VIRGINIA.

SCREW REVERSE-GEAR FOR ENGINE-VALVES.

1,144,455.      Specification of Letters Patent.      Patented June 29, 1915.

Application filed December 1, 1914. Serial No. 874,967.

*To all whom it may concern:*

Be it known that we, WILLIAM A. AUSTIN and SHERMAN S. LAWSON, both citizens of the United States, the said WILLIAM A. AUSTIN residing at 415 South Cole street, Lima, county of Allen, and State of Ohio, and the said SHERMAN S. LAWSON residing at 858 West Market street, Lima, county of Allen, and State of Ohio, have invented certain new and useful Improvements in Screw Reverse-Gear for Engine-Valves, fully described and represented in the following specification and the accompanying drawings, forming a part of the same.

The present invention relates to certain improvements in a valve reverse-gear operated by a manually-rotated operating screw.

The invention may be applied for reversing the valve in any engine provided with a valve-reversing link, but the apparatus is shown mounted upon a bracket of construction especially fitted for attachment to the fire-box of a locomotive. In this class of valve reverse-gear it is common to mount one end of the screw in a stationary bearing and to propel a nut by the manual rotation of the screw, the nut being connected with the reach-rod for shifting the reverse links of the engine valve-gear, and the object of the present invention is to improve the engagement of the screw with the reach-rod in such a manner that the crosshead which connects the screw-nut with the reach-rod may be removed from the other parts for repairs without disturbing the crosshead-guide or the screw, and also in such manner that the crosshead may be connected with the reach-rod clevis by a yoke so engaged with the crosshead that the yoke and reach-rod can be removed without disturbing either the crosshead, the crosshead-guide, or the screw. Such improvements greatly facilitate the disconnection of the parts when repairs are necessary and also their subsequent re-assembling. These objects are attained in the first respect, by providing only a single crosshead-guide disposed wholly at one side of the screw, with a crosshead having separable parts fitted to opposite sides of such guide and screw, and engaged detachably with a nut upon the screw, by which means the parts of the crosshead can be separated and removed from the guide and nut without disturbing any of the other parts. In the second respect, by connecting the crosshead with the clevis of the reach-rod by a yoke formed of two yoke-pieces engaged detachably with opposite sides of the crosshead, and extended beyond the end of the screw into connection with the clevis. Such yoke-pieces are held together upon the crosshead by their connection with the clevis and by a cross-tie which is arranged at one side of the screw so as to clear the same.

In the annexed drawing, Figure 1 is a side elevation of the reverse-gear with a diagrammatic representation of the rock-shaft for controlling the two reverse-links in a locomotive valve-gear; Fig. 2 is a plan of the reverse-gear with the reach-rod attached to the yoke of said gear; Fig. 3 is an elevation of the bearings for the screw and hand-wheel; Fig. 4 is a section on line 4—4 in Fig. 3; Fig. 5 is a section of the crosshead on line 5—5 in Fig. 1; and Fig. 6 is a section of the crosshead on line 6—6 in Fig. 1. Fig. 7 is a section on line 7—7 in Fig. 1.

A designates the side of the fire-box, upon which a bed-piece B is permanently secured to receive the foot C of the bracket, which is secured detachably to such bed-piece by the bolts D. The bracket extends horizontally and has two transverse arms, the arm E extending across the center line of the screw and forming a bearing for the journal of the screw F, and having a lug E′ projected from the top of the arm over the axis of the screw. The arm G at the opposite end of the bracket does not cross the center of the screw like the arm E but is extended upwardly at one side of the same and has a lug G′ extended over the axis of the screw, so that the lugs E′ and G′ may support a single guide-bar H which forms the sole guide for the crosshead, wholly at one side of the screw. The screw has a cog-wheel *a* upon its end outside of the bearing E, and a similar wheel *b* is meshed with the same and journaled on an adjacent shaft I in a bearing I′ at one side of the bearing E. The shaft of the cog-wheel *b* is provided with the hand-wheel *c* which thus operates to rotate the screw when the hand-wheel is turned. The use of these cog-wheels locates the hand-wheel in a more convenient relation to the position of the engineer in a locomotive cab. The screw is provided with a movable nut *d* having studs *e* upon its opposite sides, and the crosshead is formed of two side-plates *f* fitted to the opposite sides of the guide-bar H and extending past the center line of the screw upon its opposite sides, so as to intersect the said studs. The crosshead plates have holes *e'* fitted to receive the studs, and are also provided with adjacent trunnions *g'* to connect with the reach-rod *h*. The crosshead-plates *f* are wholly separable from one another and from the guide-bar H and are connected by transverse bolts *i* and packing-blocks *j* extending between the plates at the upper and lower sides of the guide-bar.

Fig. 6 shows the blocks formed integral with the plates *f*, but Fig. 5 shows them separate and rabbeted to the inner sides of the plates, which serves to hold plates rigidly in alinement. The removal of the bolts *i* permits the crosshead to be wholly separated from the guide-bar and from the nut *d* without unfastening the guide-bar or removing the screw or nut from their working positions.

The arm *g* upon the bracket is set far enough at one side of the screw to clear a yoke which connects the crosshead with the reach-rod, and is formed of two yoke-pieces or side-parts *k* having journal-holes *g'* to fit the trunnions *g* upon the crosshead, and at the other end are bolted to opposite sides of the reach-rod clevis *l*. The side-parts are formed of flat bars spaced far enough apart to clear the sides of the screw, and are connected together below the level of the screw by lugs *m* and bolts *m'* extended through the same and a spacing-block *n*.

In Fig. 2, the rear end of the reach-rod *h* is shown screwed into the clevis *l* and locked by jam-nuts *l²*, and the forward end of the reach-rod is shown screwed into a fork *o* and locked therein by nut *o'*.

In Fig. 1, the fork *o* of the reach-rod is shown journaled to a crank *p* upon a rock-shaft *q*, upon which, in practice, cranks *s* are fastened to move the links of the valve-gear. The clevis has a collared sleeve *l'* swiveled in its forward end, and threaded internally to fit the rear end of the reach-rod.

The head *l³* of the sleeve is fitted to receive a wrench, and the sleeve may thus be turned to adjust the reach-rod. This construction avoids the disconnection of the fork *o* from the crank *p* to adjust it, or the rotating of the reach-rod, the offset *h'* of of which interferes with its rotation.

The ends of the side-parts *k* rock slightly upon the trunnions *g* in moving the crank *p* back and forth over the rock-shaft *q*, and their journals *g'* fit detachably upon the trunnions so that they can be freely separated therefrom by merely removing the bolts *m'* which tie the side-parts together, and then springing them apart to clear the trunnions. This can be effected without disturbing the screw, the crosshead, or its guide-bar H. In like manner, the removal of the bolts *i* permits the free detachment of the crosshead-parts from the guide-bar H, as the side-plates of the crosshead slip freely from the studs *e* when the plates are removed from the guide-bar.

The crosshead is shown provided with gibs *r* fitted between the packing-blocks *j* and the upper and lower sides of the guide-bar H, and such gibs can be removed and renewed, or the crosshead repaired in any other manner without disturbing the guide-bar, the screw, or its nut.

It will be observed that the lugs E' and G' support the crosshead-guide H parallel with the screw S, but that the arms E and G which carrying those lugs are not in line with one another, as the arm E crosses the axis of the screw, while the arm G lies at a considerable distance to one side of the same, to permit the free passage of the yoke during the movements of the reach-rod.

The screw is provided, upon opposite sides of its bearing, with anti-friction thrust-collars *t* which may be made with balls or rolls to reduce the friction, or of any other approved construction.

The gear *a* is counterbored upon its outer side, and a small collar or head *a'* upon the end of the screw is fitted to the counterbore, so that the head *a'* resists the pull upon the screw when it draws the nut toward the bearing E.

The thrust upon the screw when moving the nut in the opposite direction is sustained by one of the anti-friction collars and by jam-nuts *u* adjacent to the same. The thread to which these jam-nuts are fitted, and the shank F' of the screw which fits the bearing E', is a little larger than the thread of the screw F, so that the latter (with the cog-wheel *a* fitted against the head *a'*) may be passed through the bearing from the outer end of the same, before the inner thrust-collar and the jam-nuts *u* are applied. The strain upon the screw is thus amply supported, while the jam-nuts can be adjusted to prevent lost motion.

This reverse-gear is formed with relatively few parts, and of simple construction, and affords the advantages specified above in respect to the separation of certain parts from others without dismantling the apparatus.

A casing *v* is shown inclosing the cog-wheels *a* and *b*, and a latch-lever *w* is shown in Fig. 4 hinged upon the arm forming the bearing E, and provided with a latch or dog *w'* adapted to engage the teeth of the cog-wheel *a* when the reverse-gear is adjusted by properly turning the screw F.

Heretofore, a special notched disk has been required upon the screw-shank to operate with such a latch; but in our construction the latch engages the cog-wheel a, and the need of a special notched disk is thus avoided.

Having thus set forth the nature of the invention what is claimed herein is:

1. In a valve reverse-gear, the combination, with an operating screw and a hand-wheel for rotating the same, of a single guide-bar extended by the side of the screw, suitable means for connecting the said parts operatively together, a nut upon the screw, a crosshead having separable parts fitted detachably upon the guide-bar and connected to the nut, and a yoke journaled detachably upon opposite sides of the crosshead, with a clevis connected detachably to the yoke for connection to a reach-rod, whereby the crosshead may be detached from the guide-bar and nut without disturbing the screw, nut or guide-bar, and the yoke of the reach-rod may be detached from the crosshead without disturbing the operative connection of the crosshead, the nut and the guide-bar.

2. In a valve reverse-gear, the combination, with an operating screw, and a hand-wheel for rotating the same, of a bracket having a bearing for the screw adjacent to the hand-wheel, and arms upon opposite ends of the bracket extended transverse to the screw, a bar attached to the arms forming a single crosshead-guide wholly at one side of the screw, a crosshead supported wholly upon such single guide-bar and having a nut fitted to the screw, and a reach-rod connected to the crosshead.

3. In a valve reverse-gear, the combination, with a bracket having a bearing at one end with an operating screw journaled therein and means for rotating the same by hand, of a single bar sustained upon the bracket at one side of the screw to form a crosshead-guide, a crosshead having separable parts fitted detachably to opposite sides of the guide-bar and screw, a nut fixed in the crosshead and fitted to the said screw, and a reach-rod connected to the crosshead.

4. In a valve reverse-gear, the combination, with an operating screw and a hand-wheel for rotating the same, of a single guide-bar extended by one side of the screw, a crosshead having separable parts secured detachably upon the guide-bar, a nut upon the screw with freely detachable connection to the parts of the crosshead, and a reach-rod having a yoke extended at opposite sides of the screw and having detachable trunnion-connection with the outer sides of the crosshead.

5. In a valve reverse-gear, the combination, with a bracket having a bearing at one end with an operating screw journaled therein and means for rotating the same by hand, of a single bar sustained upon the bracket at one side of the screw to form a crosshead-guide, a crosshead having separable parts fitted detachably to opposite sides of the guide-bar and screw, a nut fixed in the crosshead and fitted to the said screw, trunnions upon opposite sides of the crosshead, yoke-pieces journaled upon such trunnions and connected together at one side of the line of the screw, and a clevis and reach-rod attached to the said yoke.

6. In a valve reverse-gear, the combination, with a bracket having a bearing at one end with an operating screw journaled therein, and means for rotating the screw by hand, of a single bar sustained upon the bracket at one side of the screw to form the sole crosshead-guide, a nut upon the screw with trunnions projected laterally therefrom, a crosshead having separable parts fitted detachably to the sides of the guide-bar and to the said trunnions, and a reach-rod connected to the said crossbar.

7. In a valve reverse-gear, the combination, with an operating screw and a hand-wheel for operating the same, of a bracket having a bearing adjacent to the hand-wheel with an arm projected upwardly therefrom and having a lug extended over the axis of the said screw, an arm at the opposite end of the bracket disposed at one side of the screw and having a lug projected over the axis of the screw, a bar attached to the lugs upon the arms and forming the sole crosshead-guide, a crosshead fitted detachably to the guide and having a nut fitted to the screw, and a reach-rod connected to the said crosshead.

8. In a valve reverse-gear, the combination, with an operating screw and a hand-wheel for rotating the same, of a bracket having a bearing adjacent to the hand-wheel with an arm projected upwardly therefrom and having a lug extended over the axis of the said screw, an arm at the opposite end of the bracket disposed at one side of the screw and having a lug projected over the axis of the screw, a bar attached to the lugs upon the arms and forming the sole crosshead-guide, a crosshead having separable parts fitted detachably to opposite sides of the guide-bar and extended by the opposite sides of the screw, a nut fixed in the crosshead and fitted to the said screw, and a reach-rod connected to the said crosshead.

9. In a valve reverse-gear, the combination, with a bracket having a bearing at one end with an operating screw having an enlarged shank journaled therein and provided upon the end with a head, of a cog-wheel fitted to the shank in contact with such head, a shaft upon the bracket adjacent to the screw-bearing, a cog-wheel upon the shaft meshing with that upon the screw-shank, a hand-wheel upon the shaft for turning the cog-wheels, and jam-nuts fitted to the screw-shank upon the inner side of the bearing whereby the pull and thrust upon the screw are fully supported, a nut and crosshead actuated by the screw, and a reach-rod connected to the crosshead.

10. In a valve reverse-gear, the combination, with an operating screw and a hand-wheel for rotating the same, of a single guide-bar extended by one side of the screw, a crosshead secured movably upon the guide-bar and having a nut fitted to the screw and trunnions upon its opposite outer side, a yoke having side-parts extended at opposite sides of the screw with their rear ends journaled upon the trunnions, and a clevis attached to their forward ends and having a threaded sleeve swiveled therein and adapted for rotation in the clevis to engage and adjust a reach-rod.

11. In a valve reverse-gear, the combination, with a bracket having a bearing at one end with an operating screw journaled therein and a hand-wheel for rotating the screw, of a single bar supported upon the bracket at one side of the screw to form a crosshead-guide, a crosshead having separable parts fitted detachably to opposite sides of the guide-bar and screw, a nut fixed in the crosshead and fitted to the said screw, trunnions upon opposite sides of the crosshead, a yoke having side-parts with their rear ends journaled upon the trunnions, and a clevis secured to the other ends of the yoke-pieces and having a threaded sleeve swiveled therein and adapted for rotation in the clevis to engage and adjust a reach-rod.

In testimony whereof we have hereunto set our hands in the presence of two subscribing witnesses.

WILLIAM A. AUSTIN.
SHERMAN S. LAWSON.

Witnesses:
  I. W. GREEN,
  CHAS. F. REYNOLDS.

Copies of this patent may be obtained for five cents each, by addressing the "Commissioner of Patents, Washington, D. C."